United States Patent
Paul

(10) Patent No.: US 9,859,697 B1
(45) Date of Patent: Jan. 2, 2018

(54) WATERTIGHT ELECTRICAL COMPARTMENT FOR USE IN IRRIGATION DEVICES AND METHODS OF USE

(71) Applicant: Hunter Industries, Inc., San Marcos, CA (US)

(72) Inventor: Michael F. Paul, San Diego, CA (US)

(73) Assignee: Hunter Industries, Inc., San Marcos, CA (US)

( * ) Notice: Subject to any disclaimer, the term of this patent is extended or adjusted under 35 U.S.C. 154(b) by 0 days.

(21) Appl. No.: 15/207,323

(22) Filed: Jul. 11, 2016

(51) Int. Cl.
 *A01G 25/00* (2006.01)
 *G01F 15/14* (2006.01)
 *H02G 3/08* (2006.01)

(52) U.S. Cl.
 CPC ............ *H02G 3/088* (2013.01); *A01G 25/00* (2013.01); *G01F 15/14* (2013.01); *H02G 3/08* (2013.01); *H02G 3/081* (2013.01)

(58) Field of Classification Search
 CPC ........ H02G 3/088; H02G 3/081; A01G 25/00; G01F 15/14
 USPC .......................................................... 174/541
 See application file for complete search history.

(56) References Cited

U.S. PATENT DOCUMENTS

| | | | | |
|---|---|---|---|---|
| 6,715,994 | B2* | 4/2004 | Patel | F04B 39/121 417/12 |
| 2006/0222508 | A1* | 10/2006 | Cantolino | F24F 13/222 417/40 |

OTHER PUBLICATIONS

Node Battery-Operated Controller Owner's Manual and Programming Instructions, Hunter Industries, Inc., dated May 2011, in 20 pages.
Wireless Valve Controller, Multiple Station Battery Powered Irrigation Controller Owner's Manual and Installation Instructions, Hunter Industries, Inc., dated May 2006, in 16 pages.
TBOS-II Control Module Technotes, Rainbird Corporation, dated Jul. 2012, in 20 pages.
DDC WP Series Waterproof Battery Controller Installation and Operating Instructions, the Toro Company, dated Oct. 23, 2006, in 6 pages.

* cited by examiner

*Primary Examiner* — Timothy Thompson
*Assistant Examiner* — Michael F McAllister
(74) *Attorney, Agent, or Firm* — Knobbe Martens Olson & Bear, LLP

(57) ABSTRACT

A watertight electrical compartment for use in an irrigation device can include a compartment body with a chamber, a sealing section mounted with one or more sealing rings, and external threads. A sealing cap mate with the sealing section and/or the sealing rings to seal the chamber. A cap retainer can be advanced over at least a portion of the sealing cap and can have internal threads to be screwed onto the external threads of the compartment body. The cap retainer can also have a stopping feature to keep the sealing cap in its sealed position. The watertight electrical compartment can be used in a wireless flow sensor assembly, a battery operated irrigation controller, and/or a battery-operated central controller device, to provide irrigation control, and/or sensor information, without the need for AC power.

14 Claims, 18 Drawing Sheets

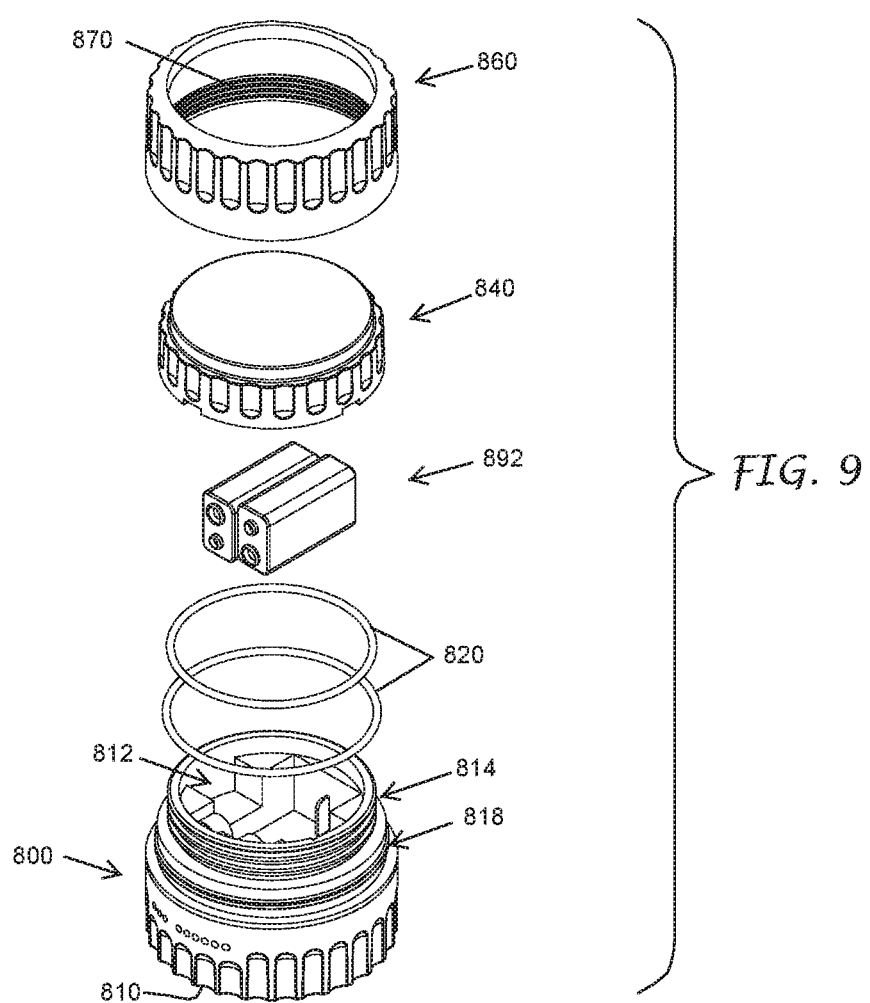

WATERTIGHT ELECTRICAL COMPARTMENT FOR USE IN IRRIGATION DEVICES AND METHODS OF USE

FIELD OF THE DISCLOSURE

This disclosure relates to irrigation devices, and more particularly, to a watertight electrical compartment for sealing a compartment to be used in irrigation devices against the entry of water, mud, sand, dirt and the like.

BACKGROUND

An automatic irrigation device saves time, water, and money. Flow sensors are typically used to measure the amount of water flowing through an automated irrigation device. The flow sensor is normally connected to a mainline pipe that provides water to irrigation valves. The flow sensor is also wired to a terminal on an irrigation controller to transmit information about the amount of water that has flowed past the sensor to the controller. The controller may be connected to an electrical circuit that operates a solenoid attached to each irrigation valve and normally determines watering start and stop times. In some irrigation devices, the flow sensor can also automatically shut down the irrigation device if an overflow condition occurs.

Subterranean plastic valve boxes are commonly used for mounting irrigation valves, the flow sensor, and pipes of an irrigation device. The irrigation valve box makes it easier to repair and replace the irrigation device. The box can be covered by a plastic lid to prevent water, mud, dirt and the like from entering the box. In some environments, however, water, dirt, mud, and other environmental hazards may enter the box and gain access to the sensors, valves, and/or other components therein.

SUMMARY

There are situations in which obtaining AC power supply is not available or wiring the flow sensor to the controller is impractical or impossible. Examples of those situations include, but are not limited to, isolated sites, power-restricted areas, municipalities where underground power lines have not been laid, newly developed houses where power supply is not yet available, mines, and forests after a forest fire. In those situations, a battery operated controller may be advantageously used to provide irrigation without the need for power connections. Further, in an area where a large number of battery operated controllers are installed and managed by a single entity, it is inconvenient for the service crew to individually turn on and off each irrigation device. For example, all the irrigation devices may need to be turned off during the rain and to be turned back on after the rain. There may also be need to reprogram the watering times of each controller as weather patterns change throughout the year. Accordingly, there is a need to provide a wireless battery-operated central control device to centrally manage all the battery operated irrigation devices in the area from a central computer. A wireless battery-operated central control device may include a controller to turn irrigation valves on and off.

There are situations in which it is impractical to physical wire a flow sensor to an irrigation controller. Examples of these may be where hardscapes, building, mature landscaping, roadways, or water in the form of ponds, pools, or streams may be in the path of the proposed wiring which may substantially inhibit a user's ability to run the wiring. In those situations, a wireless flow sensor assembly may be used in conjunction with other irrigation devices to provide feedback regarding the operation of an irrigation system. The wireless flow sensor can be powered by battery that is housed in a separate compartment and electrically connected to the flow sensor. The battery can be replaced every one to three years.

In these applications, wireless communication can use radiofrequency signals or other known wireless technology.

Both the wireless flow sensor assembly (WFS) and the battery-operated central control device (BOCC) can include an antenna or a transmitter that may need to be installed above the ground in order to transmit and/or receive signals. The WFS and the BOCC can be mounted inside the valve box with the antenna or transmitter extending above the ground through a hole cut in the plastic lid for transmitting and/or receiving signals.

The valve boxes are often flooded during rain or irrigation. Additionally, it is common for gophers or other animals to back fill the boxes so that the boxes are filled with mud and dirt, essentially burying the devices inside. It is important that water or mud entering the box does not get inside the electrical compartment to interfere with normal functioning of the battery or other electronic components inside the electrical compartment. Accordingly, there is a need for a watertight electrical compartment that can prevent entry of water, mud, dirt and the like.

Having one or more sealing rings, such as O-rings, between an electrical compartment body and a sealing cap can be effective in sealing the electrical compartment. Nevertheless, the friction between the sealing ring and the sealing cap makes it difficult to screw the sealing cap onto the compartment body. Likewise, once the cap has been tightly screwed onto the compartment body, the sealing ring makes it difficult to unscrew the cap, thereby making it difficult to reopen the electrical compartment. However, as mentioned above, the battery in the electrical compartment may need to be replaced every one to three years; other electronic components that can be housed in the electrical compartment may also require servicing at intervals. Accordingly, there is a need for a watertight electrical compartment that has easy-to-open sealing features for replacing the battery or servicing the electrical components housed inside the compartment.

According to some embodiments, a watertight electrical compartment for use in an irrigation device can include an electrical compartment body, at least one sealing ring, a cap, and a cap retainer. The electrical compartment body can comprise a chamber with an open end, and an outer wall surface having external threads and a sealing section, the sealing section located closer to the open end of the chamber than the external threads. The at least one sealing ring can have a diameter configured for mounting on the sealing section. The cap can have an open end, a closed end, and an internal diameter configured to have a sliding fit with the sealing section and an interference fit with the sealing ring when the sealing ring is mounted on the sealing section. The cap retainer can have internal threads configured to threadedly mate with the external threads of the compartment body, the cap retainer further having first and second ends, the cap retainer configured to receive at least a portion of the cap through the first end. In some embodiments, the compartment can be configured to be electrically coupled to a flow sensor.

In some embodiments, the cap can further include a non-threaded inner wall. In some embodiment, the cap can have a reduced outer diameter on its closed end and the cap retainer has a reduced inner diameter on its second end, the reduced inner diameter of the cap retainer configured to slidably accommodate the reduced outer diameter of the cap. In some embodiments, a wall of the cap can further comprise at least one notch at the open end.

In some embodiments, the cap retainer can have an inner wall comprising a non-threaded portion further away from the first end of the cap retainer than the inner threads. In some embodiments, the cap retainer can have a shoulder at its second end having an internal diameter smaller than an outer diameter of the cap. The shoulder can be configured to keep the cap engaged with the sealing section when the internal threads of the cap retainer mates with the external threads of the compartment body.

In some embodiments, the sealing section can further comprise at least one groove configured to receive the at least one sealing ring. In some embodiments, the watertight electrical compartment can further a plurality of sealing rings positioned between the cap and the outer wall surface of the electrical compartment body. In some embodiments, the sealing ring can be resilient.

In some embodiments, the chamber of the compartment body can be configured to house at least one battery. In some embodiments, the chamber can comprise battery contacts. In some embodiments, the chamber can comprise a DIP switch. In some embodiments, the chamber can comprise flash programming pads.

In some embodiments, the watertight electrical compartment can further include an electrical wire extending through the closed end of the cap and the cap is sealed after the wire has passed through the cap.

According to some embodiments, a method of sealing a watertight electrical compartment for use in an irrigation device can include providing an electrical compartment body comprising a chamber with an open end, an outer wall surface having external threads and a sealing section, the sealing section located closer to the open end of the chamber than the external threads; mounting at least one sealing ring onto the sealing section; sliding a cap having an open end and a closed end over the sealing section through the open end, the cap having an internal diameter configured to have a sliding fit with the sealing section, wherein an inner wall of the cap compresses the sealing ring mounted on the sealing section; sliding a cap retainer having first and second ends over at least a portion of the cap through the first end of the cap retainer, the cap retainer having a stopper on the second end for retaining the cap, the cap retainer further having internal threads; and turning the cap retainer so that the internal threads mate with the external threads of the compartment body to keep the cap in a sealed position. In some embodiments, the method of sealing a watertight electrical compartment for use in an irrigation device can further include mounting a plurality of sealing rings onto the sealing section. In some embodiments, sliding the cap retainer over at least a portion of the cap can comprise advancing the internal threads of the cap retainer past the cap towards the external threads of the compartment body.

All of these embodiments are intended to be within the scope of the disclosure herein. These and other embodiments will become readily apparent to those skilled in the art from the following detailed description having reference to the attached figures, the disclosure not being limited to any particular disclosed embodiment(s).

BRIEF DESCRIPTION OF THE DRAWINGS

These and other features, aspects, and advantages of the present disclosure are described with reference to the drawings of certain embodiments, which are intended to schematically illustrate certain embodiments and not to limit the disclosure.

FIG. 9 is an exploded view of the battery-powered irrigation controller of FIGS. 8A-D.

DETAILED DESCRIPTION

Although certain embodiments and examples are described below, those of skill in the art will appreciate that the disclosure extends beyond the specifically disclosed embodiments and/or uses and obvious modifications and equivalents thereof. Thus, it is intended that the scope of the disclosure herein disclosed should not be limited by any particular embodiments described below.

Watertight Electrical Compartment

Figure 1:
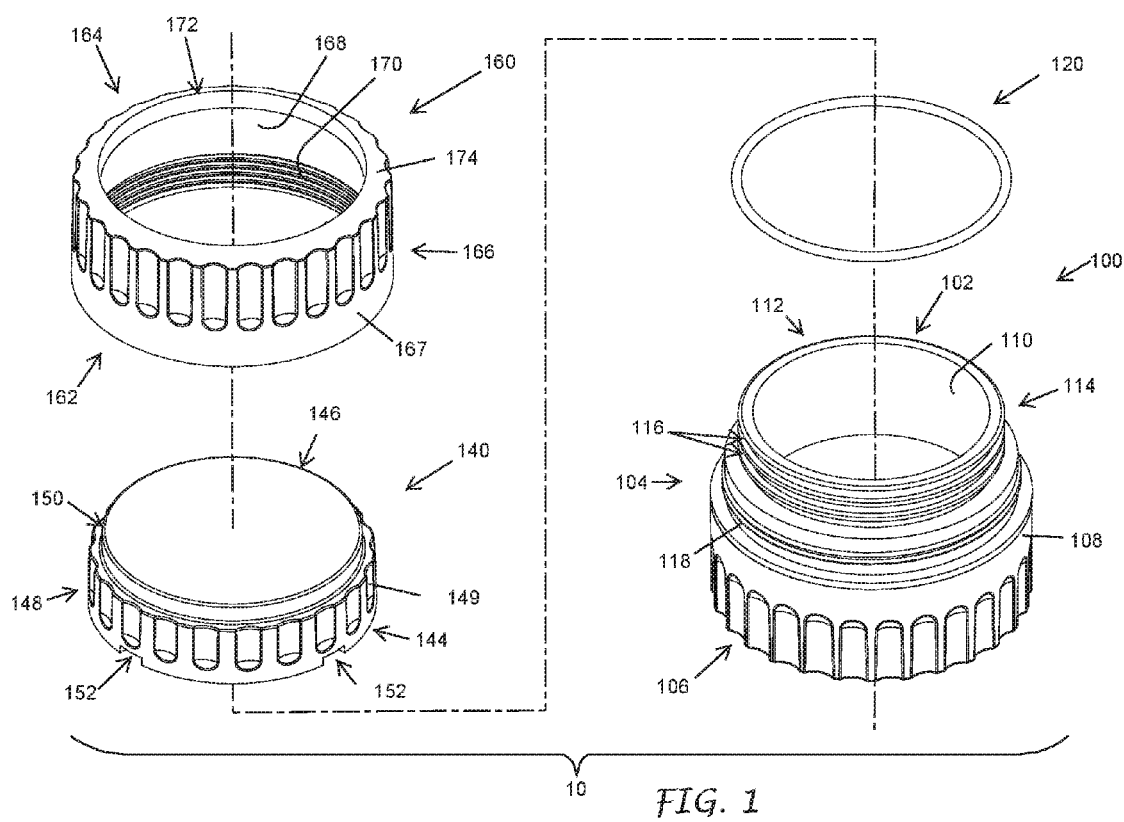
FIG. 1 is an exploded view of an embodiment of a watertight electrical compartment.

FIG. 1 shows an embodiment of a watertight electrical compartment 10 to be used in an irrigation device. The watertight electrical compartment 10 can comprise an electrical compartment body 100, a sealing ring 120, a sealing cap 140, and/or a cap retainer 160. The electrical compartment body 100, the sealing cap 140, and the cap retainer 160 can be made of any material suitable for environments exposed to water, mud, dirt, and the like, such as plastic materials. The compartment body 100, the sealing cap 120, and the cap retainer 160 can be made of the same material or different materials. The electrical compartment 10 can be of any size depending on a user's need.

In some embodiments, the sealing ring 120 can be mounted on the sealing section 114 of the compartment body 100. The sealing cap 140 can mate with the sealing section 114 and/or the sealing ring 120 to seal the compartment body 100. The cap retainer 160 can connect to the compartment body 100 and retain the sealing cap 140 in a sealed position between the cap retainer 160 and the compartment body 100.

As shown in FIG. 1, the electrical compartment body 100 can be cylindrically shaped with an first (e.g., open) end 102 and a second (e.g., closed) end 106. The shape of the compartment body 100 is not limiting. For example, in some cases, the compartment body 100 has a polygonal cross-section, an elliptic cross-section, or some other shape. The compartment body 100 can further comprise a wall 104 between the open and closed ends 102, 106. The wall 104 can have different/varying thicknesses from the open end 102 to the closed end 106. An inner wall surface 110 and the closed end 106 can define a chamber 112. In the illustrated embodiment, the chamber 112 can be cylindrically shaped. In other embodiments, the chamber 112 can have other shapes, such as, for example, rectangular or conical. In the illustrated embodiment, the inner wall surface 110 and the closed end 106 can be smooth. In other embodiments, the inner wall surface 110 and the closed end 106 can have irregular surfaces.

Figure 7:
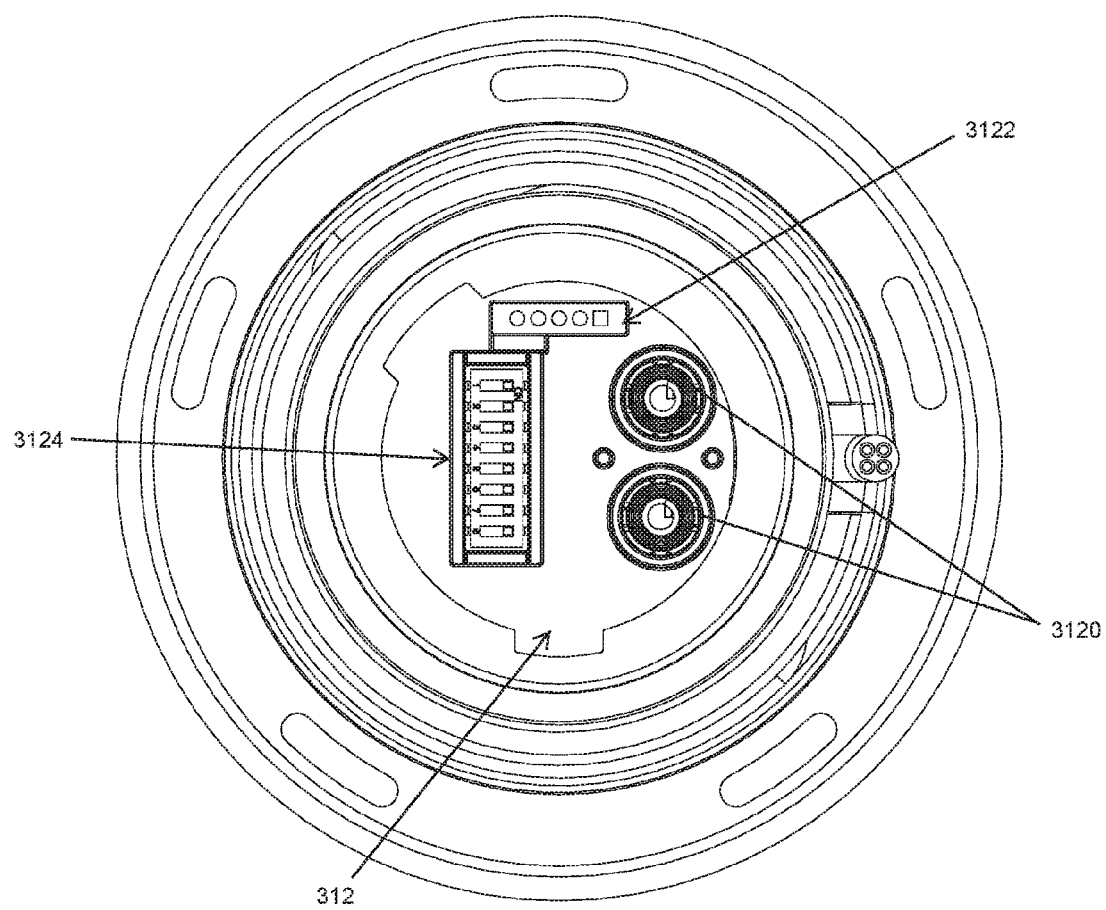
FIG. 7 is a top view of a compartment body of the watertight electrical compartment of the WFS assembly of FIG. 3.

In some embodiments, the chamber 112 can house a battery. In those embodiments, the chamber 312 can have battery contacts (e.g., the batter contacts 3120 as shown in FIG. 7). In some embodiments, the chamber 312 can also house electronic components or circuitry, for example, DIP switch 3124 (shown in FIG. 7), flash programming pads 3122 (shown in FIG. 7), memory cards, and the like. The type of electronic components or circuitry housed in the chamber 112 is not limiting. Electronic components or circuitry can be embedded at the bottom of the chamber 112, in the inner wall surface 110 of the chamber 112, and/or in some other location. The location of the electronic components in the chamber 112 is not limiting.

Turning back to FIG. 1, a sealing section 114 can be located on an outer wall surface 108 of the compartment body 100 near the open end 102. The wall 104 can have a first outer diameter at the sealing section 114. In some embodiments, the sealing section 114 can have one or more grooves 116 on the outer wall surface 108, each groove 116 configured to receive one or more sealing rings. In some embodiments, the sealing section 114 can have a plurality of grooves 116, each groove configured for receiving a sealing ring 120. On the outer wall surface 108, external threads 118 can be located further away from the open end 102 than the sealing section 114. The external threads 118 can have a major diameter that is greater than the first outer diameter of the wall 104 at the sealing section 114. In the illustrated embodiment, a different between the major diameter of the external threads 118 and the first outer diameter of the wall 104 is large enough to accommodate a wall thickness of the cap 140. In some embodiments, the external threads can be custom threads having any desired size and/or tolerance. In the illustrated embodiment, the external threads 118 can be separate from the sealing section 114 so as not to interfere and/or overlap with the sealing section 114. A portion of the compartment body 100 near the closed end 106 can have a third outer diameter that is substantially the same or greater than the major diameter of the external threads 118. The third outer diameter can be substantially the same as an outer diameter of the cap retainer 160 to advantageously provide a smooth and esthetically pleasing outer shape of the sealed electrical compartment 10. In some embodiments, portions of, or the entire third outer diameter are smaller than the major diameter of the external threads 118 and/or smaller than the outer diameter of the cap retainer 160.

With continued reference to FIG. 1, the sealing ring 120 can have an inner diameter configured for being received by the sealing section 114. In the illustrated embodiment, the sealing ring 120 can have an inner diameter configured for a tight fit between the sealing ring 120 and the groove 116. The sealing ring 120 can also have an outer diameter that is greater than the first outer diameter of the wall 104 at the sealing section 114. When the sealing ring 120 is received at the sealing section 114, a portion of the sealing ring 120 can extend radially outward from the outer wall surface 108 at the sealing section 114. The precise extent to which the sealing ring 120 extends out from the grooves 116 is not limiting. In some embodiments, the sealing ring 120 can be resilient. In some embodiments, the sealing ring 120 can be made from elastomeric materials. For example, the sealing ring 120 can be an O-ring. The resilient sealing ring 120 can advantageously conform to a space between the outer wall 104 of the compartment body 100 and an inner wall surface 142 (shown in FIG. 2) of the sealing cap 140 when the sealing cap 140 slides over the sealing section 114, thereby providing effective sealing of the electrical compartment 10. In some embodiments, one sealing ring 120 can be used. In other embodiments, a plurality of sealing rings can be used. In some embodiments, grease can be applied on the sealing ring 120 to allow the sealing cap 140 to slide smoothly over the sealing ring 120 mounted on the sealing section 114 and/or to reduce wear on the sealing ring 120.

As shown in FIG. 1, the sealing cap 140 can be cylindrically shaped, although the shape of the sealing cap 140 is not limiting. The sealing cap 140 can have a first (e.g., open) end 144, a second (e.g., closed) end 146, and a wall 148 between the open and closed ends 144, 146.

Figure 2:
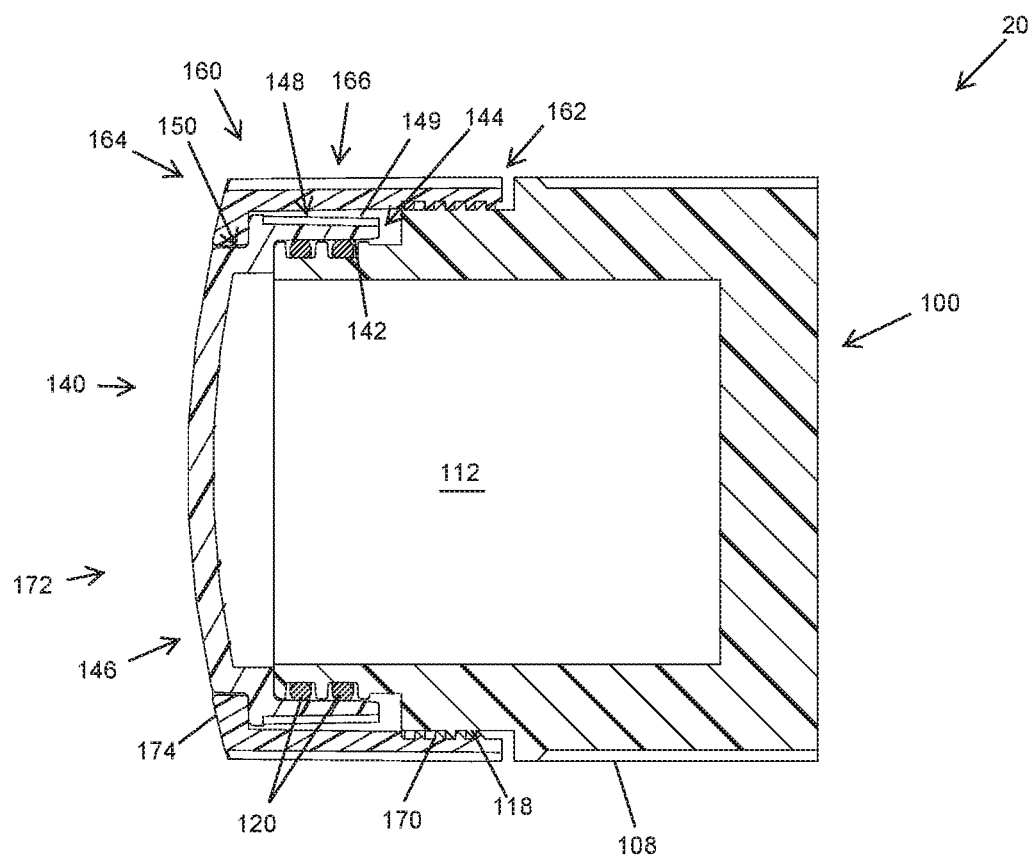
FIG. 2 is a cross-sectional view of an embodiment of a watertight electrical compartment.

More details of the sealing cap 140 will now be described with respect to FIG. 2. FIG. 2 shows a cross-sectional view of a watertight electrical compartment 20. The electrical compartment 20 is similar to the electrical compartment 10 except that that the electrical compartment 20 can have two sealing rings 120. Accordingly, features of the electrical compartment 20 can be incorporated into features of the electrical compartment 10 and features of the electrical compartment 10 can be incorporated into features of the electrical compartment 20.

As shown in FIG. 2, an inner wall surface 142 of the cap 140 can have an internal diameter configured to have a sliding fit with the sealing section 114 and an interference fit with the sealing ring 120 when the sealing ring 120 is mounted on the sealing section 114. Also as shown in FIG. 2, the sealing ring 120 can be compressed between the groove 116 and the inner wall surface 142 of the sealing cap 140. In the illustrated embodiments, the inner wall surface 142 is not threaded. Turning back to FIG. 1, the wall 148 of the sealing cap 140 has a greater outer diameter near its open end 144 than at its closed end 146. As mentioned above, the thickness of the wall 148 can be defined by the difference between the greater outer diameter and the internal diameter and can be smaller than the difference between the major diameter of the external threads 118 and the first outer diameter of the wall 104 of the compartment body 100. With reference to FIGS. 1-2, when the sealing cap 140 fits over the sealing section 114 of the compartment body 100, an outer wall surface 149 of the sealing cap 140 can be located radially inward from the major diameter of the external threads 118, thereby advantageously inhibiting or preventing the sealing cap 140 from blocking the cap retainer 160 from moving at least partially past the sealing cap 140 toward the second end 106 of the compartment body 100. The outer wall surface 149 also has a reduced-diameter portion 150 extending from the closed end 146 toward the open end 144. In some embodiments, the reduced-diameter portion 150 can have a height of about 0.1" to 0.5". In some embodiments, the reduced-diameter portion 150 can have a height of about 0.15". In the illustrated embodiments, the reduced-diameter portion 150 can be cylindrical with a substantially uniform diameter. In other embodiments, the reduced-diameter portion 150 can be tapered, with the diameter increasing, e.g. gradually, from the closed end 146 toward the open end 144. In some embodiments, the sealing cap 140 can have one or more notches 152 at the open end 144. The notches 152 can advantageously allow the cap 140 be pried open, e.g. with a screw driver or other tool, in case the cap 140 is stuck during removal of the cap 140 from the compartment body 100 to reopen the sealed compartment 10.

With continued reference to FIG. 1, the cap retainer 160 can be cylindrically shaped, although the shape of the cap retainer 160 is not limiting. The cap retainer 160 can have a first end 162, a second end 164, and a wall 166 between the first and second ends 162, 164. An inner wall surface 168 of the cap retainer 160 can have internal threads 170 configured to threadedly mate with the external threads 118 of the compartment body 100. In some embodiments, the internal threads 170 can be located near the first end 162 (e.g., nearer the first end 162 than the second end 164). Having the internal threads 170 on the cap retainer 160 instead of on the sealing cap 140 can advantageously allow easy turning of the cap retainer 160 because the sealing cap 140 can cover the sealing ring 120 from the cap retainer 160. For example, the threaded engagement between the cap retainer 160 and component body 100 can be separate from the sealed engagement between the cap 140 and the body 100. The internal threads 170 can be custom threads having any desired size and/or tolerance. The inner wall surface 168 can have an internal diameter that is bigger than the greater outer diameter of the sealing cap 140. In some embodiments, the cap retainer 160 and the sealing cap 140 can have a sliding fit. The sliding fit can allow the cap retainer 160 and the sealing cap 140 to rotate and/or move easily against each other. In some embodiments, the cap retainer 160 and the sealing cap 140 can have a running fit. The running fit can allow the cap retainer 160 and the sealing cap 140 to rotate and/or move freely past each other.

In the illustrated embodiment, the inner wall surface 168 can also have a non-threaded portion further away from the first end 162 of the cap retainer 160 than the internal threads 170. The non-threaded portion can advantageously allow the cap retainer 160 to smoothly move over at least a portion of the sealing cap 140. In the illustrated embodiment, the second end 164 of the cap retainer 160 can have an opening 172 surrounded by a shoulder 174. The opening 172 can have a diameter that is greater than the reduced diameter of the reduced-diameter portion 150 of the sealing cap 140, but less than the greater diameter of the sealing cap 140. As shown in FIG. 2, when the cap retainer 160 is advanced from the closed end 146 of the sealing cap to its open end 144, the reduced-diameter portion 150 of the sealing cap 140 can pass through the opening 172, when the rest of the sealing cap 140 can be stopped from exiting the opening 172 by the shoulder 174. A depth of the opening 172 can be defined by a thickness of the cap retainer 160 at the second end 164. In some embodiments, the depth of the opening 172 can be about 0.1" to 0.5". In the illustrated embodiment, the depth of the opening 172 is the substantially same as the height of the reduced-diameter portion 150 of the sealing cap 140 so that the closed end 146 of the sealing cap 140 can be substantially flush with the second end 164 of the cap retainer 160, resulting in a smooth and esthetically pleasing shape of the electrical compartment 10 when the electrical compartment 10 is sealed. Also as shown in FIG. 2, the opening 172 through the second end 164 has a substantially uniform diameter. In other embodiments, the opening 172 can be tapered, with the diameter increasing (e.g. gradually increasing) from the second end 164 toward the first end 162. In yet other embodiments, the opening 172 can have one or more raised bumps or grooves to snap onto one or more corresponding grooves or raised bumps on the reduced-diameter portion 150 of the sealing cap 140. In some embodiments, the second end 164 can be closed to retain the sealing cap 140.

The embodiment of watertight electrical compartments 10, 20, as shown in FIGS. 1-2 can advantageously provide effective sealing via the sealing ring 120 between the compartment body 100 and the sealing cap 140, while still allowing easy turning of the cap retainer 160, which is separate from the sealing cap 140 and not subject to the friction provided by the sealing ring 120. The cap retainer 160 can retain the sealing cap 140 in a sealed position by the mating of the internal threads 170 on the cap retainer 160 and the external threads 118 on the compartment body 100. The cap retainer 160 can also be easily screwed on and off from the compartment body 100 to allow replacement and/or servicing of the electrical components housed inside the chamber 112.

Turning back to FIG. 1, the outer wall surface 108 near the closed end 106 of the compartment body 100, the outer wall surface 149 near the closed end 146 of the sealing cap 140, and/or an outer wall surface 167 near the second end 164 of the cap retainer 160 can further have a rugged or textured surface to increase friction between the outer wall surface and a user's hand for easy gripping. In other embodiments, the entire outer wall surfaces 108, 149, 167 can be rugged or textured. In the illustrated embodiment, the outer wall surfaces 108, 149, 167 can have a plurality of vertical indentations extending down a portion of the outer wall surfaces 108, 149, 167. In other embodiments, the outer wall surfaces 108, 149, 167 can be corrugated. In yet other embodiments, the outer wall surfaces 108, 149, 167 can have raised pumps.

In some embodiments, a modified watertight electrical compartment can be similar to the electrical compartment 10 and can have features of the electrical compartment 10 except as described below. The modified electrical compartment can have a compartment body with a smooth outer wall surface near its open end 102 and a sealing cap 140 with a sealing section on its inner wall for receiving at least one sealing ring.

Methods of Sealing a Watertight Electrical Compartment

Methods of sealing a watertight electrical compartment, such as the electrical compartments 10, 20 of FIGS. 1-2 will now be described. The electrical compartment body 100 as described above can be provided for housing electronic components and/or circuitry in its chamber 112. A sealing ring 120 can be mounted on the sealing section 114. As shown in FIG. 2, a plurality (e.g., two or more) of sealing rings 120 can be mounted on the sealing section 114. In some embodiments, the sealing ring 120 can be resilient, for example, an O-ring. The sealing ring 120 can be slightly expanded by a radially outward force to clear the first outer diameter of the compartment body 100 and then advanced from the open end 102 of the compartment body 100 to the sealing section 114. The radially outward force on the sealing ring 120 can then be released so that the sealing ring 120 can form a tight fit with the sealing section 114. In some embodiments, the sealing ring 120 can form a tight fit with the groove 116 of the sealing section 114. In some embodiments, a plurality of the sealing rings can be mounted on one groove (not shown). In some embodiments, there may be more than one groove 116 with one sealing ring 120 in each groove 116.

With continued reference to FIGS. 1-2, the sealing cap 140 as described above can be placed over the sealing section 114. The sealing section 114 can be directed through the open end 144 of the sealing cap to reach a sealed position. The inner wall surface 142 of the sealing cap 140 can slide over the outer wall surface 108 of the sealing section 114. In some embodiments, the inner wall surface 142 of the sealing cap 140 can compress the sealing ring 120 mounted on the sealing section 114 as the sealing cap 140 moves over the sealing section 114. The compressed sealing ring 120 can advantageously conform to any space between the inner wall surface 142 of the sealing cap 140 and the outer wall surface 108 of the sealing section 114, thereby sealing the space. In some embodiments, the sealing ring(s) can be positioned on the inner wall surface 142 (e.g., in grooves) prior to mating the cap 140 with the sealing section 114.

With the sealing cap 140 in the sealed position, the cap retainer 160 as described above can be advanced over the sealing cap 140. For example, the sealing cap 140 can pass through the first end 162 of the cap retainer 160. As described above, the wall thickness of the sealing cap 140 can allow the outer wall surface 149 of the sealing cap 140 to be located radially inward of the outer wall surface 108 at the major diameter of the external threads 118. The cap retainer 160 can thus be advanced over at least a portion of the sealing cap 140 unhindered. In some embodiments, the cap retainer 160 can be advanced over at least a portion of the sealing cap 140 unhindered until the internal threads 170 of the cap retainer 160 reach the external threads 118 of the compartment body 100.

The cap retainer 160 can be turned so that the internal threads 170 can mate with the external threads 118 of the compartment body 100 to lock the cap retainer 160 on the compartment body 100. The cap retainer 160 can also have a stopper on the second end 164 for preventing the sealing cap 140 from disengaging the sealing section 114 and/or the sealing ring 120, thereby locking the sealing cap 140 in the sealed position. As shown in FIGS. 1-2, the stopper can comprise the shoulder 174 as described above so that only the reduced-diameter portion 150 of the sealing cap 140 can pass through the opening 172 and the rest of the sealing cap 140 can be stopped from moving through the opening 172 by the shoulder 174 because the opening 172 can be smaller than the greater outer diameter of the sealing cap 140. However, one of ordinary skill in the art should appreciate from the disclosure herein that other types of stopper can be used to keep the sealing cap 140 in the sealed position. In some embodiments, the shoulder 174 contacts the major-diameter portion of the sealing cap 140 before all the internal threads 170 can engage the external threads 118. In other embodiments, the shoulder 174 can just contact the major-diameter portion of the sealing cap 140 as all the internal threads 170 have substantially engaged the external threads 118.

Wireless Flow Sensor Assembly (WFS)

Example applications for a watertight electrical compartment, such as the electrical compartments 10,20 as shown in FIGS. 1-2, will now be described. In some embodiments, the electrical compartment 30 can be used in a wireless flow sensor assembly (WFS) in FIGS. 3-5. The electrical compartment 30 is similar to the electrical compartments 10, 20 of FIGS. 1-2 except as described below. Accordingly, features of the electrical compartment 30 can be incorporated into features of the electrical compartments 10, 20 and features of the electrical compartments 10, 20 can be incorporated into features of the electrical compartment 30.

As shown in FIGS. 3 and 4A-4F, the WFS assembly 3 can include the watertight electrical compartment 30, an antenna dome 330, a lid retainer nut 35, a flow sensor retainer cap 36, a flow sensor 32, and/or an electrical wire 34 connecting the flow sensor 32 and the electrical compartment 30. In some embodiments, two or more components in the assembly communicate via wireless connection. The sealing cap 340, sealing retainer 360, and sealing section 314 (shown in FIG. 5) of the compartment body 300 can operate in the same or in a similar manner to the operation of the sealing cap 140, sealing retainer 160, and sealing section 114 of the compartment body 100 described above.

Figure 3:
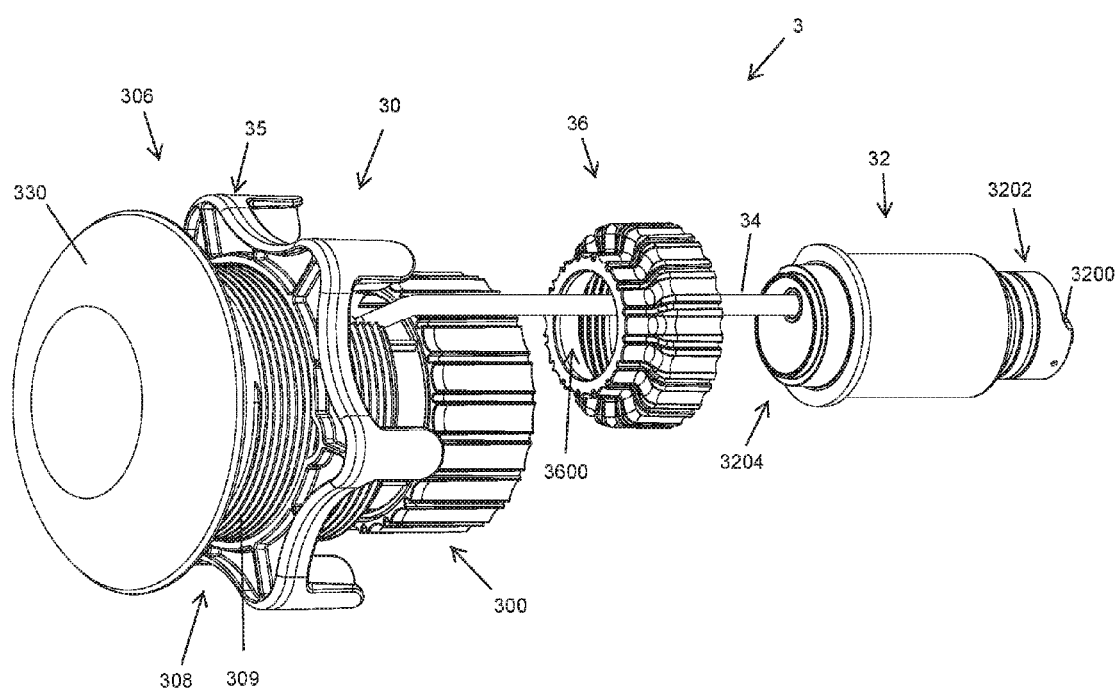
FIG. 3 is a perspective view of an embodiment of a wireless flow sensor assembly (WFS) having a watertight electrical compartment.
Figure 4A:
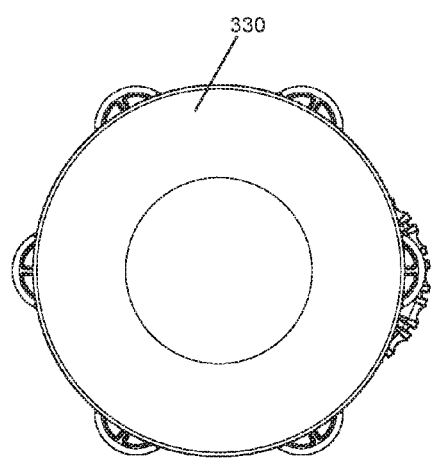
FIGS. 4A-F are top, bottom, front, back, left and right views of the WFS assembly of FIG. 3.
Figure 4B:
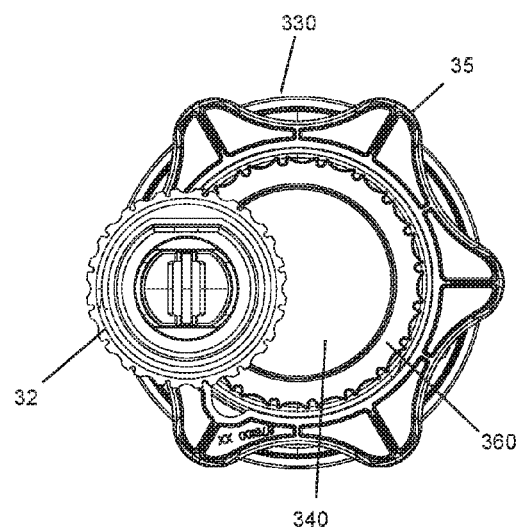
Figure 4C:
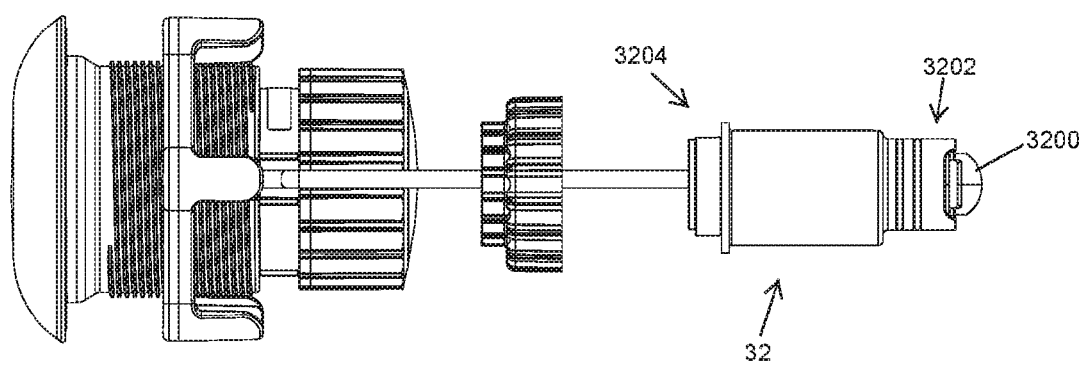
Figure 4D:
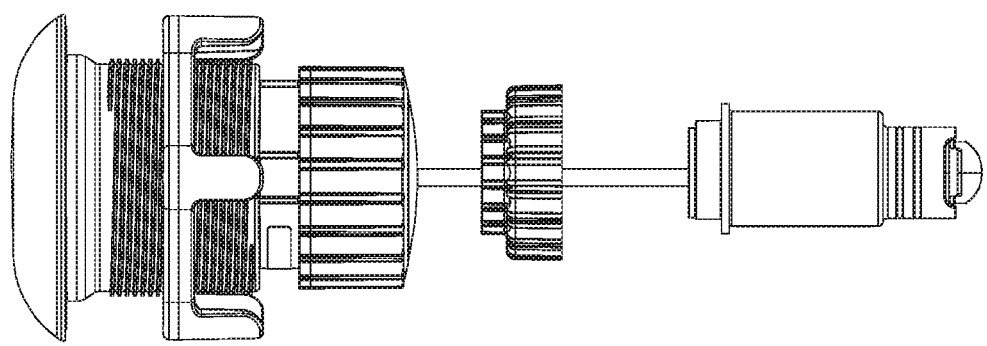
Figure 4E:
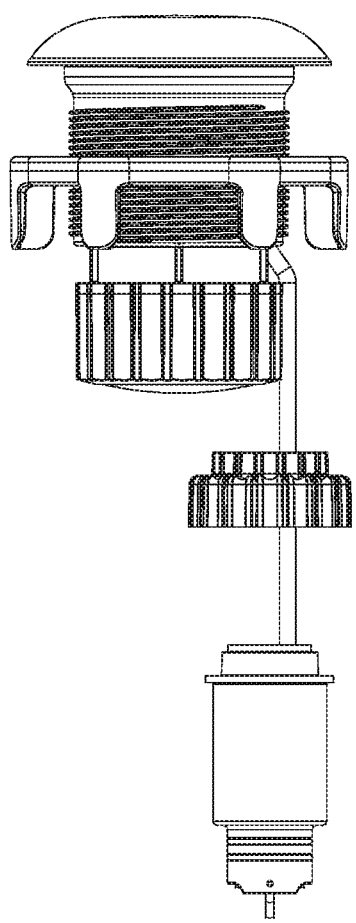
Figure 4F:
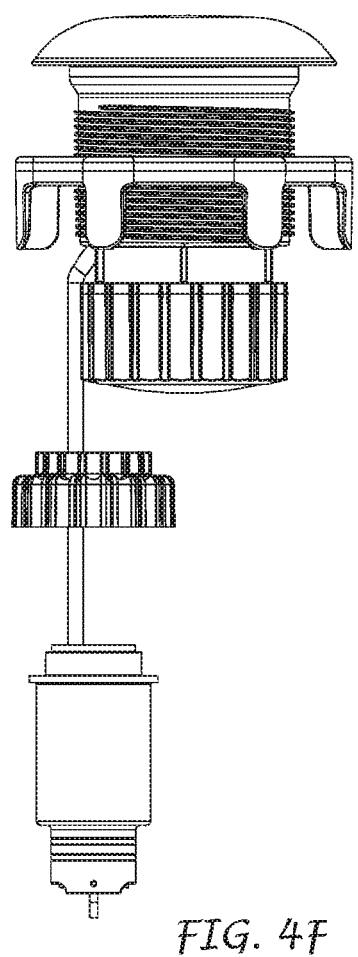

As shown in FIG. 3, the flow sensor 32 can have an impeller 3200 on a first end 3202. The flow sensor 32 can also be electrically coupled to the wire 34 at a second end 3204. The flow sensor 32 can be installed on a water line (e.g., into a T-connector perpendicular to a main water pipe that supplies water to an irrigation device). The flow sensor retainer 36 can retain the sensor 32 onto the T-connector. In the illustrated embodiment, the wire 34 can pass through a hole 3600 of the flow sensor retainer 36. The impeller 3200 can turn as the water flows through the pipe. The flow sensor 32 can generate a signal at intervals or continuously based on the amount of flow. For example, the flow sensor 32 can generate a signal each time a predetermined volume of water has flowed past the sensor 32. The signal can be sent in a manner described below to an irrigation controller (not shown) that can interpret and respond to the signal data from the sensor 32.

Figure 5:
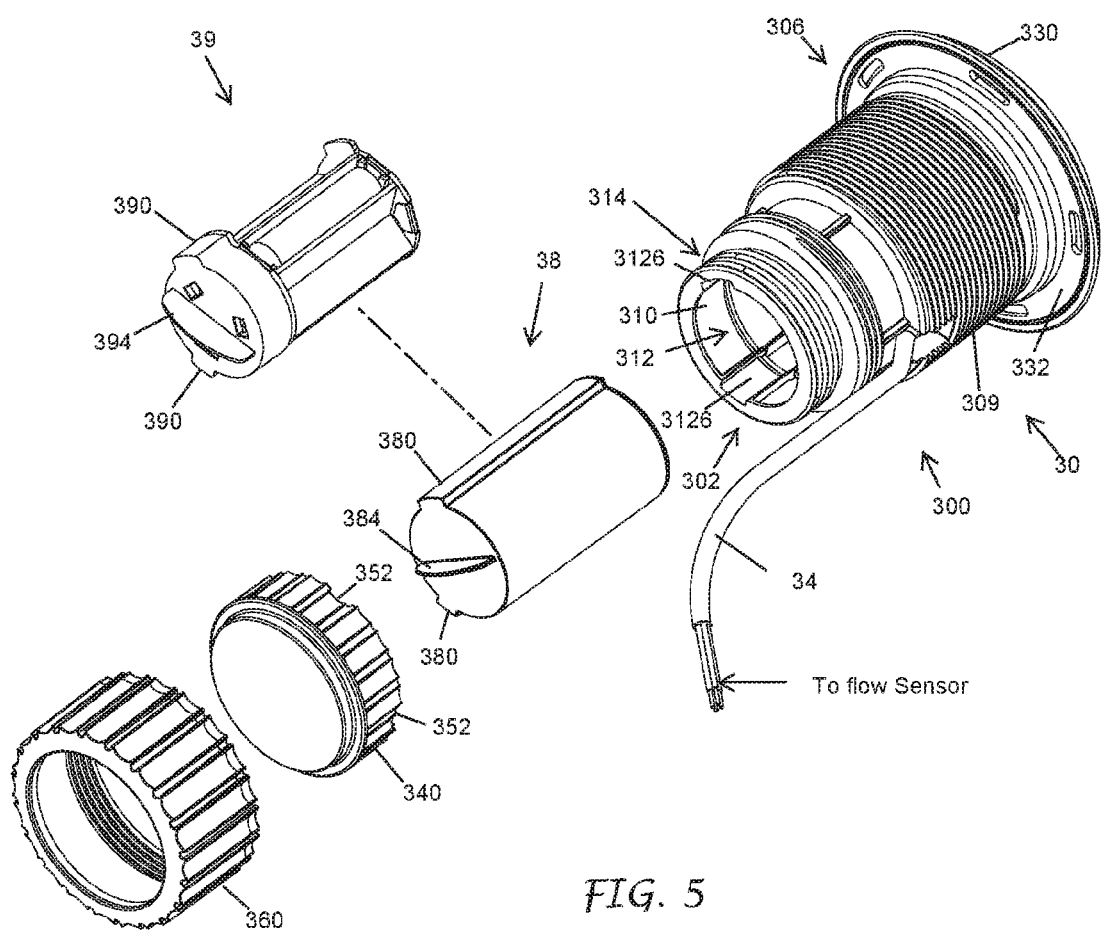
FIG. 5 is an exploded view of the WFS assembly of FIG. 3 with the flow sensor and the lid retainer nut removed for clarity.

As described above, the wire 34 can electrically couple the flow sensor 32 and the electrical compartment 30. FIG. 5 illustrates an exploded view of the electrical compartment 30. As shown in FIG. 5, a chamber 312 of the compartment body 300 can house a battery holder 38 or 39. In some embodiments, the battery holder 38 may house a "D" size battery. In some embodiment's, the battery holder 39 may hold one or more "AA" sized batteries. In some embodiments, the battery holder 39 may hold three "AA" size batteries. Other battery holders holding different sized batteries could be used. In some embodiments, the chamber 312 holds a battery without a separate holder. In the illustrated embodiment, the battery holders 38, 39 can have a shape complementary to a shape of the chamber 312 to advantageously minimize movements of the battery holders 38, 39 inside the chamber 312. The battery holders 38, 39 can also have two protruding longitudinal ridges 380, 390 that are not uniformly spaced around a circumference of the battery holders 38, 39. The chamber 312 can have two longitudinal notches 3126 located on the inner wall surface 310 and having substantially the same spacing as the ridges 380, 390. The ridge-notch configuration can guide a user to insert the substantially cylindrical battery holders 38, 39 into the chamber 312 only in one orientation. As shown in FIG. 5, the battery holders 38, 39 can have flat protrusions 384, 394 for easier holding of the battery holders 38 or 39 when assembling the WFS assembly 3. In some embodiments, the ridge-notch configurations of the holders 38, 39 and chamber 312 permit installation of the holders 38, 39 in a plurality of rotational orientations with respect to the chamber 312. In some embodiments, the chamber 312 may only have one notch 3126. In some embodiments, battery holders 38, 39 may only have one ridge 380, 390.

Figure 6A:
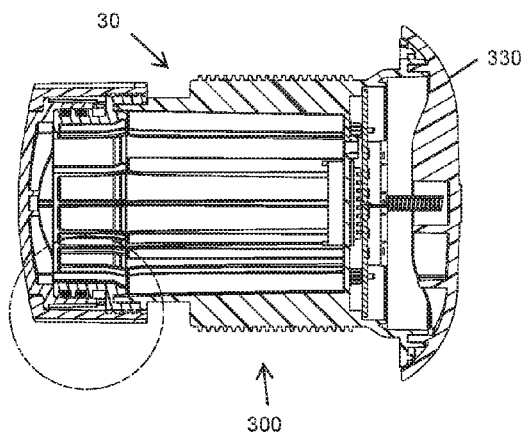
FIG. 6A is a cross-sectional view of the watertight electrical compartment of the WFS assembly of FIG. 3.
Figure 6B:
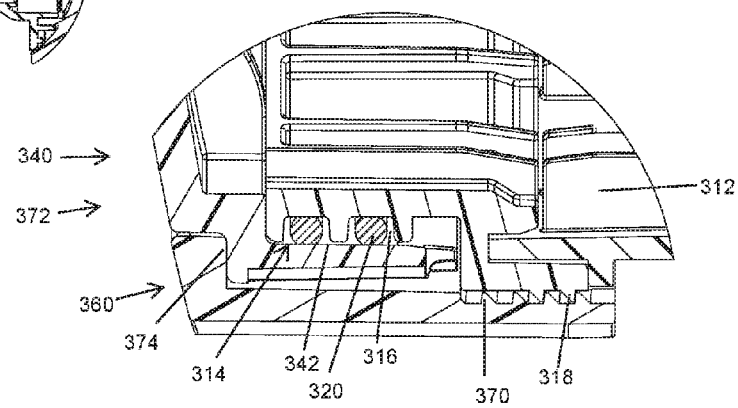
FIG. 6B is a detailed view illustrating the sealing features of the watertight electrical compartment of FIG. 6A.

Once the battery in the battery holder 38- or 39 is positioned in the chamber 312, the electrical compartment 30 can be sealed using the cap 340 and retainer 360 in a manner described above with respect to cap 140 and retainer 160. As shown in FIGS. 6A and 6B, the inner wall surface 342 of the sealing cap 340 can compress the sealing ring 320, e.g. two O-rings, against the sealing section 314, such as the grooves 316, of the compartment body 300. The cap retainer 360 can be advanced over at least a portion of the sealing cap 340. The shoulder 374 of the cap retainer 360 can inhibit the sealing cap 340 from moving through the opening 372 of the cap retainer 360 and disengaging the sealing section 314 and/or the sealing ring 320 when the cap retainer 360 is mated with the compartment body 300. The internal threads 370 of the cap retainer 360 can mate with the external threads 318 of the compartment body 300 to lock the sealing cap 340 in its sealed position.

Turning to FIG. 7, the chamber 312 can have battery contacts 3120 at its closed end. As described above, in some embodiments, the battery can be loaded into the chamber 312 in only one orientation. The particular orientation of the battery can advantageously allow terminals of the battery to be in contact with the battery contacts 3120 when loaded into the chamber 312. The chamber 312 can also have a DIP switch 3124 and flash programming pads 3122. The battery, the DIP switch 3124, and the flash programming pads 3122 can be electrically connected, e.g. in an electrical circuit, with the battery providing power to the circuit. As shown in FIG. 5, the wire 34 can exit the compartment body 300 at a location between the open and closed ends 302, 306. The wire 34 can be electrically coupled to the battery contacts 3120 so that the battery can advantageously provide power to the flow sensor 32. The wire can also send the signals from the flow sensor 32 to the electrical circuit inside the chamber 312. The signals can then be transmitted wirelessly to an irrigation controller (not shown), thereby eliminating a possible need to physically wire the flow sensor 32 to the irrigation controller. The WFS assembly 3 can also have an antenna 330 to facilitate transmitting and/or receiving signals. In the illustrated embodiment, the antenna 330 can be dome-shaped and be attached to the closed end 306 of the compartment body 300. In some embodiments, the antenna dome 330 can also receive signals, e.g. from the controller, a remote control, and/or a computer. In some embodiments, the antenna dome 330 can both transmit and receive signals. The antenna dome 330 can communicated wirelessly with another electronic device, such as the controller, intermittently or continuously.

Turning back to FIG. 3, the lid retainer nut 35 can be used to mount the electrical compartment 30 and the antenna dome 330 on a plastic lid of a valve box (not shown), in which the flow sensor 32 can be installed. Specifically, the outer wall surface 308 of the compartment body 300 can have external threads 309. As shown in FIG. 3, the external threads 309 can be located between the external threads 318 and the antenna dome 330. The lid retainer nut 35 can have internal threads (not shown) that can threadedly mate with the external threads 309 of the compartment body 300. In some embodiments, the external threads 309 can be custom threads having any desired size and/or tolerance. For installation, the sealed electrical compartment 30 can be passed through a hole on the lid (not shown). The antenna dome 330 can be located on an outer surface of the lid and can have a diameter that is bigger than the hole on the lid so that an undersurface 332 (shown in FIG. 5) of the dome 330 can rest on the outer surface of the lid. The lid retainer nut 35 can be advanced from the sealed open end 302 of the compartment body 300 toward the dome 330, while the internal threads of the lid retainer nut 35 can engage the external threads 309. The lid retainer nut 35 can stop advancing toward the dome 330 when the lid retainer nut 35 contacts an inner surface of the lid. In some embodiments, the lid retainer nut 35 can be turned another quarter to a half turn after the lid retainer nut 35 touches the inner surface of the lid to advantageously fix the lid between the dome 330 and the lid retainer nut 35.

To reopen the installed electrical compartment 30, the lid can be lifted open and turned over to exposed the sealed open end 302. The cap retainer 360 can be unscrewed from the compartment body 300. The cap retainer 360 can be easily unscrewed, not needing to overcome the friction of the sealing ring 320. The sealing cap 340 can then be pulled away from the compartment body 300. A tool such as a screwdriver can be used to pry open the sealing cap 340 at the notches 352 (shown in FIG. 5) if the sealing cap 340 gets stuck with the sealing ring 320. Once the electrical compartment 30 is reopened, the batteries can be replaced and/or electronic circuitry can be serviced.

Battery-Operated Controller

In some embodiments, the watertight electrical compartment can be incorporated into an irrigation controller to make a battery-operated controller 80 shown in FIGS. 8A-D and 9. The battery operated controller 80 is similar to the electrical compartments 10, 20 of FIGS. 1-2 except as described below. Accordingly, features of the battery operated controller 80 can be incorporated into features of the electrical compartments 10, 20 and features of the electrical compartments 10, 20 can be incorporated into features of the battery operated controller 80.

As shown in FIG. 9, the battery operated controller 80 can include a compartment body 800 having a chamber 812, a sealing section 814, and/or external threads 818. The chamber 812 can accommodate batteries 892 (e.g., DC batteries). In the illustrated embodiment, the chamber 812 can have a shape that is complementary to a shape of the batteries 892 to minimize movement of the batteries 892 inside the chamber. In some embodiments, the battery operated controller 80 includes one or more battery holders configured to retain the batteries and electrically interface with one or more features of the battery operated controller 80.

Although not shown, the chamber 812 can also include electrical circuitry for connecting with the batteries 892 so that the electrical circuitry can draw power from the batteries 892. The battery operated controller 80 also can have at least one (e.g., one, two, three, or more) sealing ring(s) 820 to be mounted on the sealing section 814, and a sealing cap 840 having an inner wall surface (not shown) to engage the sealing section 814 and/or the sealing ring(s) 820 to provide sealing of the battery operated controller 80. The battery operated controller 80 can further have a cap retainer 860 to retain the sealing cap 840 in a sealed position and having internal threads 870 to engage the external threads 818 of the compartment body 800. The sealing cap 840, sealing retainer 860, and sealing portions of the compartment body 800 can operate in the same or in a similar manner to the operation of the sealing cap 140, sealing retainer 160, and compartment body 100 described above.

Figure 8A:
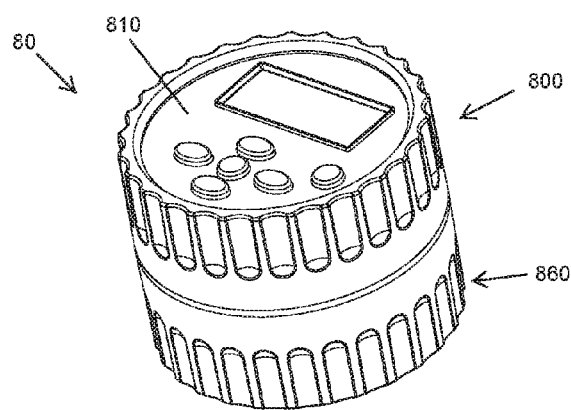
FIGS. 8A-D are perspective, top, side, and bottom views of an embodiment of a battery-powered irrigation controller.
Figure 8B:
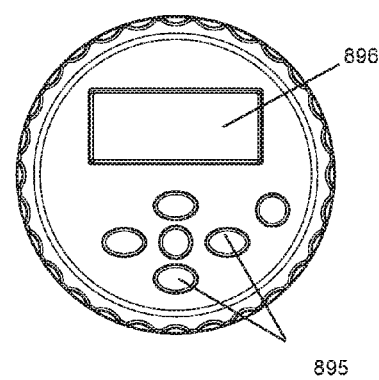
Figure 8C:
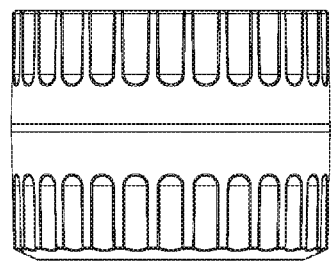
Figure 8D:
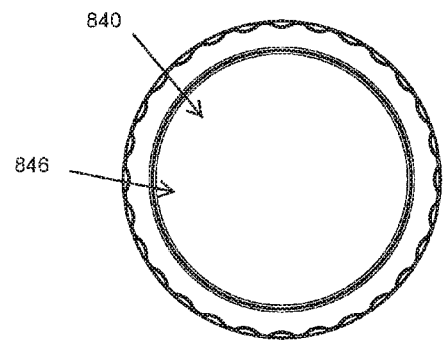

Turning to FIGS. 8A-B, the closed end 810 of the compartment body 800 can further have a user interface, including but not limited to control buttons 895 and/or a display 896. Although not shown, the user interface of the compartment body 800 can be in an electrical connection with the circuitry and the batteries 892 in the chamber 812. In some configurations, the battery operated controller 80 can allow irrigation to occur without tapping into an AC power. The battery operated controller 80 can be installed in places where it is difficult to connect the battery operated controller 80 to other sources of power (e.g., power lines). The sealing features of the battery operated controller 80 can allow the battery operated controller 80 to be installed in environments exposed frequently to rain, flooding, and/or mud without affecting the electrical circuitry and the batteries 892 sealed inside the chamber 812.

Wireless Battery-Operated Central Controller Assembly (BOCC)

Figure 10:
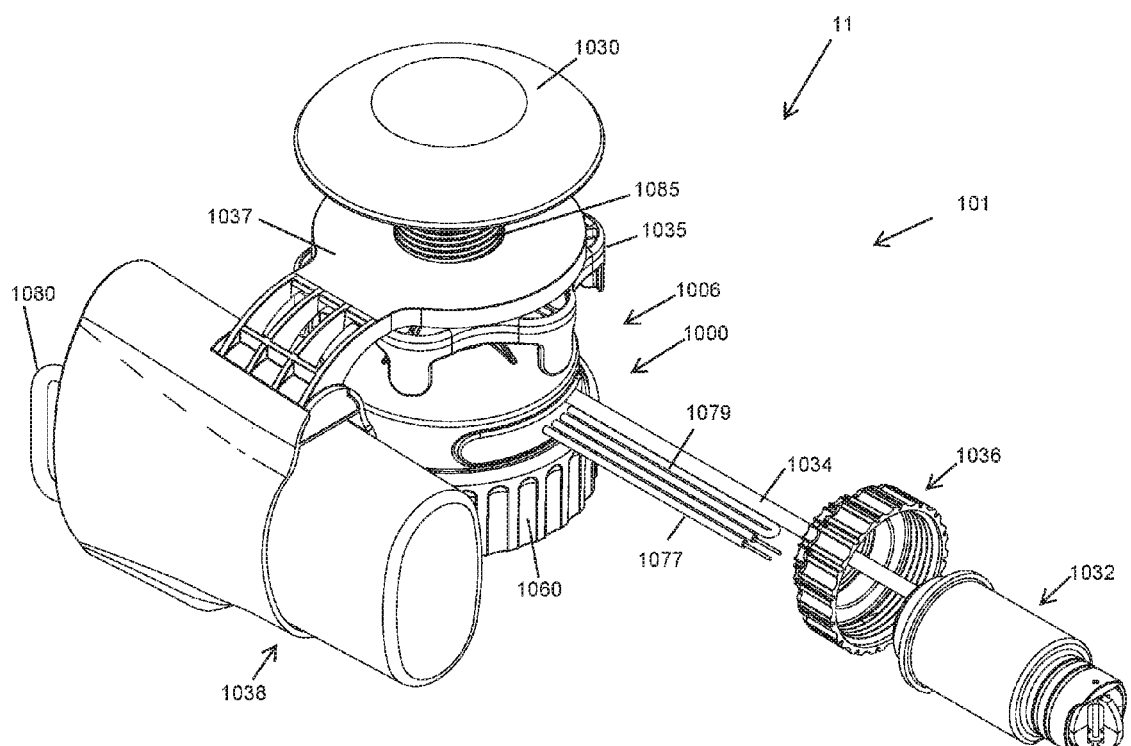
FIG. 10 is a perspective view of an embodiment of a battery-powered central controller device (BOCC) including a watertight electrical compartment for use in an irrigation device.
Figure 11A:
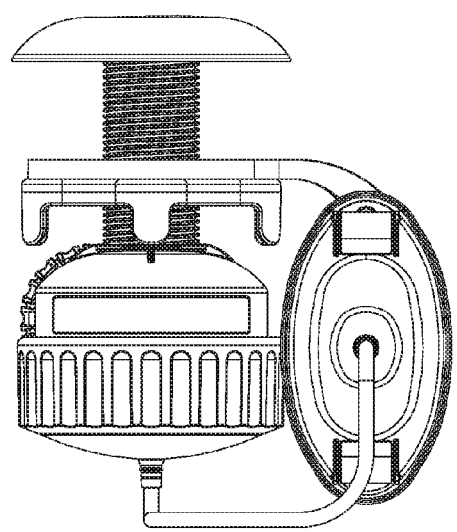
FIGS. 11A-F are top, bottom, front, back, left and right views of the BOCC of FIG. 10.
Figure 11B:
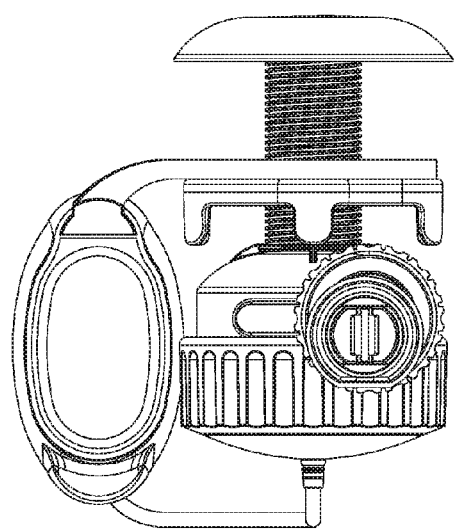
Figure 11C:
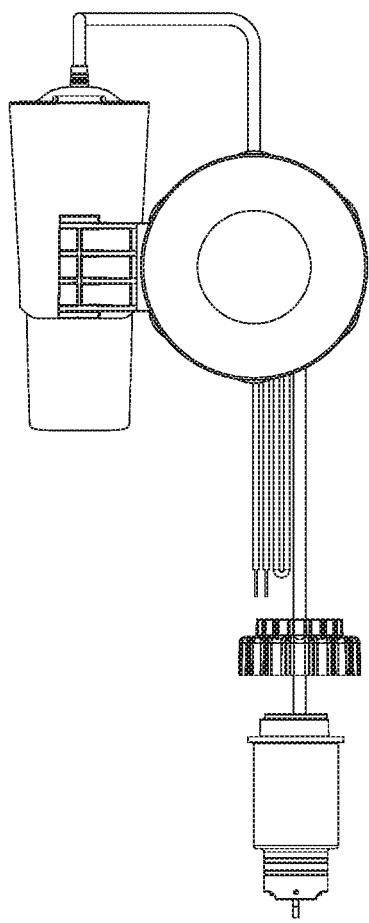
Figure 11D:
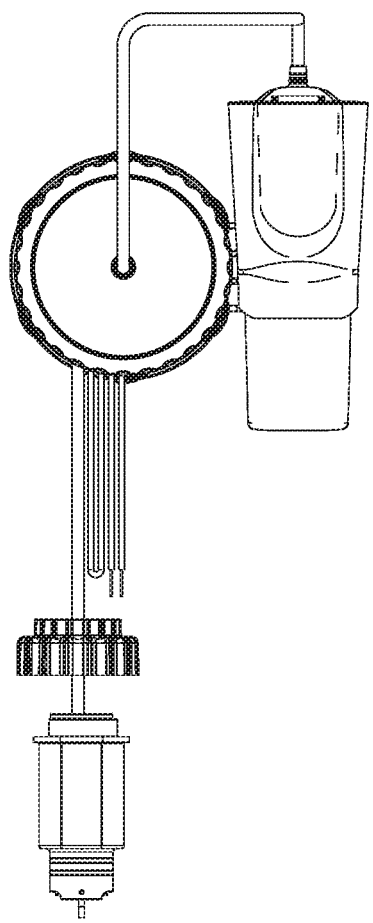
Figure 11E:
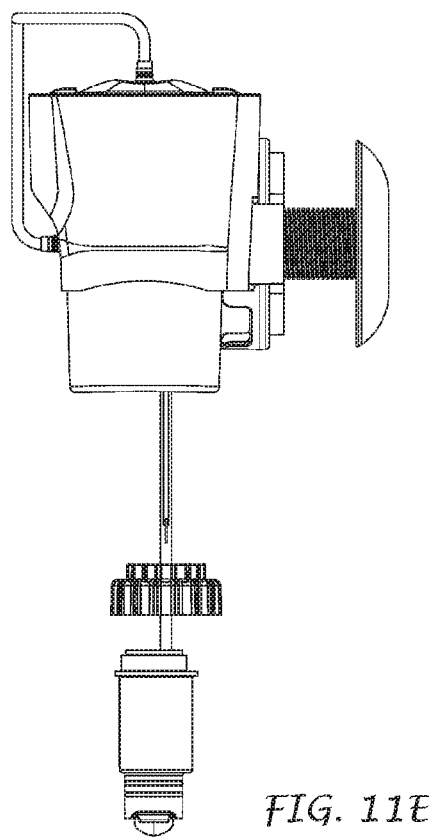
Figure 11F:
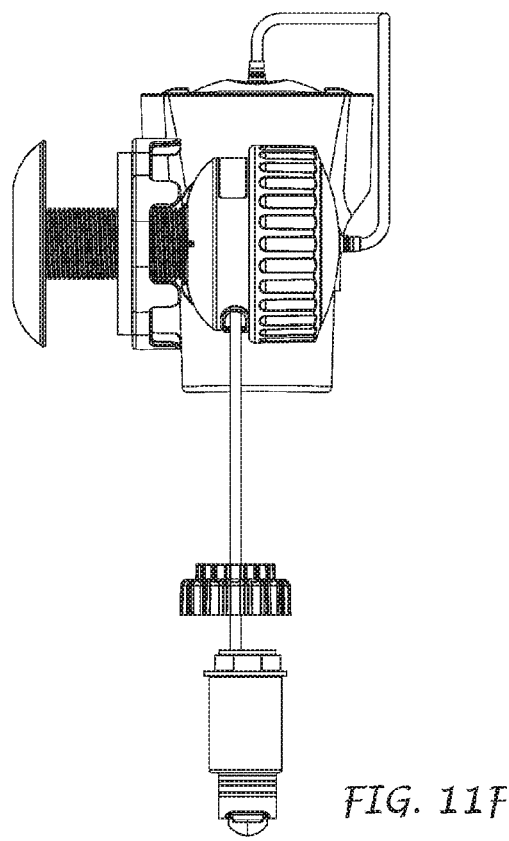
Figure 12:
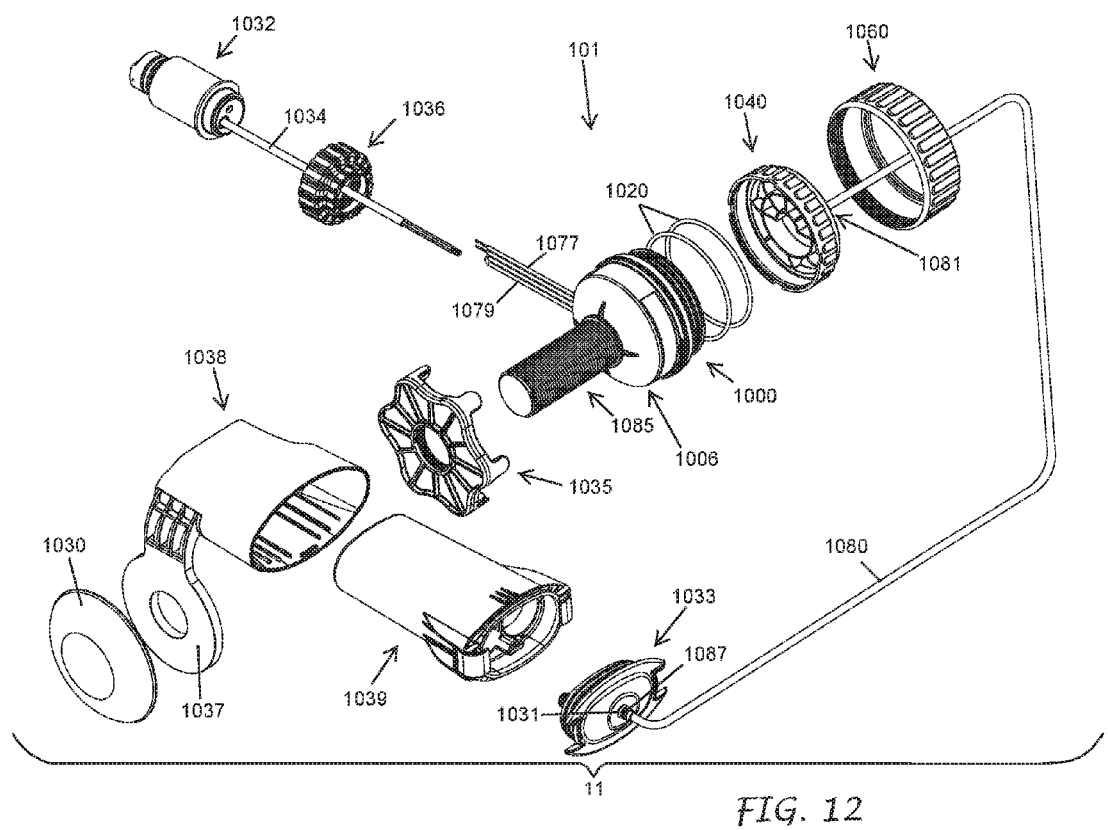
FIG. 12 is an exploded view of the BOCC of FIG. 10.

In some embodiments, the electrical compartment 101 can be used in a wireless battery-operated central controller assembly (BOCC) 11 in FIGS. 10-12. The electrical compartment 101 is similar to the electrical compartments 10, 20 of FIGS. 1-2 except as described below. Accordingly, features of the electrical compartment 101 can be incorporated into features of the electrical compartments 10, 20 and features of the electrical compartments 10, 20 can be incorporated into features of the electrical compartment 101.

As shown in FIGS. 10-12, the BOCC 11 can include the watertight electrical compartment 101, a transmitter housing 1085 for housing transmitters 1086 (shown in FIG. 13) and coupled to an antenna dome 1030, a lid retainer nut 1035, a flow sensor retainer cap 1036, a flow sensor 1032, and/or an electrical wire 1034 connecting the flow sensor 1032 and the electrical compartment 101 in a manner described below. In addition, as described above, the BOCC 11 is a battery powered irrigation controller that can be used to control multiple irrigation valves to turn those irrigation valves on and off. The BOCC 11 is in wireless communication with a central computer. Irrigation programs and other commands for turning on and off the irrigation valves can be initiated from the central computer. In some embodiments, at least one irrigation program may be sent from the central computer to the BOCC 11 and the BOCC 11 may store that irrigation program for future use. In some embodiments, the BOCC 11 may turn individual valves on and off in accordance with the stored irrigation programs. In some embodiments, the BOCC 11 can consume more power than the battery operated controller 80. In addition, the battery that can be sealed within the electrical compartment 101 can be quickly depleted and may require frequent replacements. Further, the electrical compartment 101 can already be filled with electronic components and/or circuitry possibly needed for communicating wirelessly with the central computer and have no spare space for batteries. The BOCC 11 can thus have a separate battery pack 1038 to be electrically connected to the electrical compartment 101 via an electrical wire 1080 in a manner described below to meet the power consumption need of the BOCC 11.

As shown in FIG. 12, the battery pack 1038 can have a container for holding a battery retainer 1039. The batter pack 1038 and battery retainer 1039 can be constructed from a polymer, a ceramic, a metal, a combination thereof, and/or any other suitable material. The battery retainer 1039 can be sized, shaped, and configured to retain batteries having one or more different sizes and/or ratings. In the illustrated embodiment, the container and the battery retainer 1039 can have complementary shapes to minimize movement of the battery retainer 1039 inside the container. For example, the container can have tracks on its inner wall surface for guiding ridges on an outer surface of the battery retainer 1039. The battery pack 1038 can also have a sealing cover 1033 to provide watertight sealing (e.g., with O-rings) of the container. A battery end 1087 of the wire 1080 can run through an opening 1031 of the sealing cover 1033 to contact the battery retainer 1039. A sealing cap end 1081 of wire 1080 can also run through an opening 1082 (shown in FIG. 14) of the sealing cap 1040 of the electrical compartment 101 to contact the electronic components and/or circuitry in the electrical compartment 101. As shown in FIG. 12, the battery pack 1038 can also have a mounting ring 1037 that can be used to hang the battery pack 1138 around the transmitter housing 1085. The mounting ring 1037 can advantageously keep the battery pack 1038 within close proximity of the electrical compartment 101, thereby reducing the danger of the battery pack 1038 moving further away from the electrical compartment 101 and tugging on the wire 1080.

Figure 13:
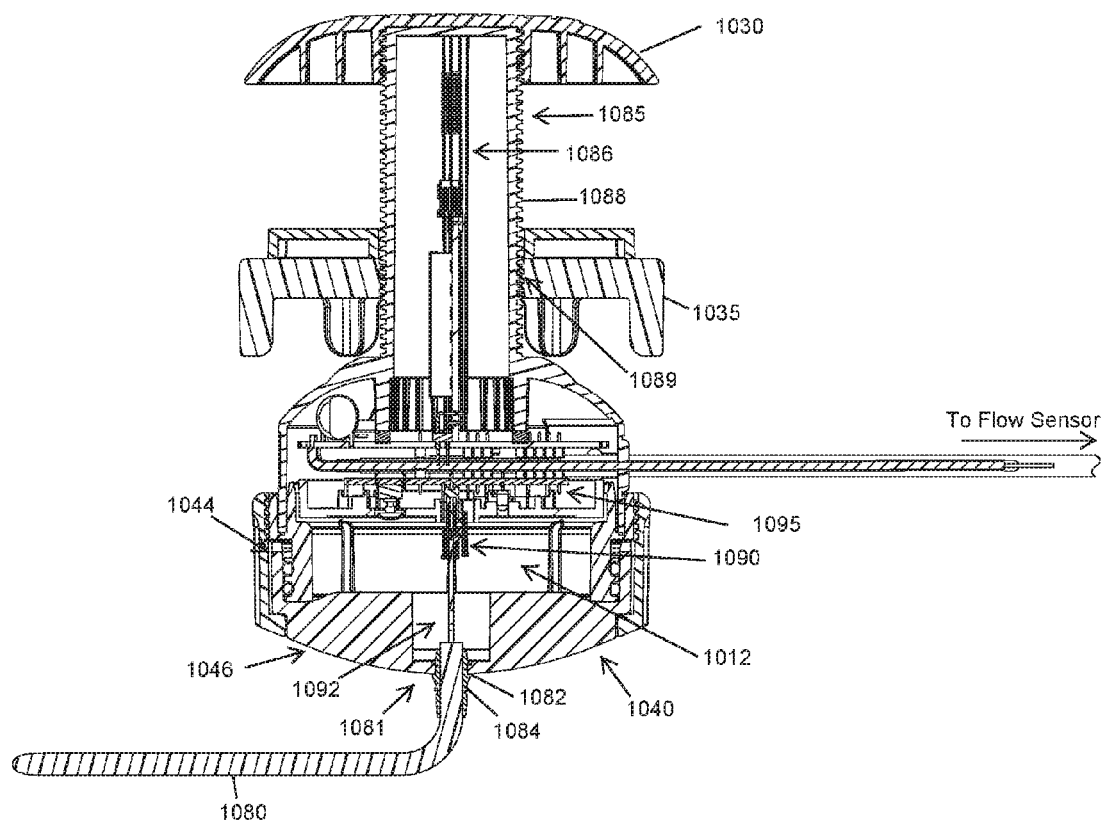
FIG. 13 is a cross-sectional view of the electrical compartment, the transmitter housing, and the antenna of the BOCC of FIG. 10.
Figure 14:
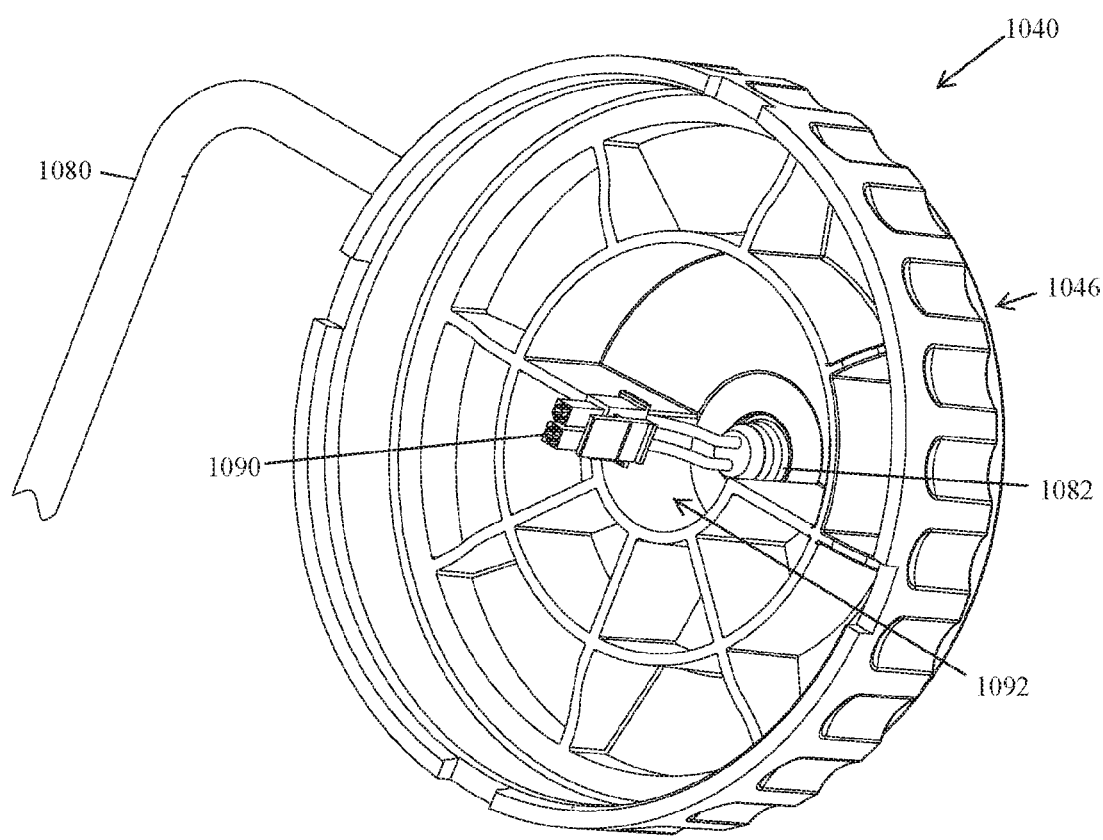
FIG. 14 is a perspective view of an embodiment of a sealing cap in a watertight electrical compartment with an electrical wire coupled to the sealing cap.

Connection of the wire 1080 to the sealing cover 1033 and the sealing cap 1040 will now be described. FIGS. 13-14 illustrates how the sealing cap end 1081 of wire 1080 can be connected to the sealing cap 1040. One of ordinary skill in the art would appreciate from the disclosure herein that the wire 1080 can be connected to the sealing cover 1033 in same or in a similar manner to the connection of the wire 1080 and the sealing cap 1040 as described below.

As shown in FIGS. 13-14, the sealing cap 1040 can comprise the opening 1082 for the electrical wire 1080 to pass through. As shown in FIG. 13, the wire 1080 can have a seal (e.g., an overmolded strain relief 1084) covering a portion of the wire 1080 at a sealing cap end 1081 of the wire 1080. The portion of the wire 1080 covered by the overmolded strain relief 1084 can be passed through the opening 1082 on the closed end 1046 of the sealing cap 1040. As shown in FIGS. 13 and 14, the sealing cap 1040 can have a filling well 1092 facing an open end 1044 of the sealing cap 1040. After the portion of the wire 1080 covered by the overmolded strain relief 1084 is passed through the opening 1082, the filling well 1092 can be filled with a sealing material to seal any gap between the opening 1082 and the overmolded strain relief 1084 so as to prevent water or mud ingress into the cap 1040 and to fix the wire 1080 to the sealing cap 1040. In some embodiments, the sealing material can be a polyurethane encapsulating compound. The strain relief 1084 can advantageously provide a transition from the flexible wire 1080 to a rigid connection point at the opening 1082 of the sealing cap 1040. More particularly, the strain relief 1084 can prevent any mechanical force applied to an exterior of the wire 1080 from being transferred to the rigid connection point at the opening 1082 of the sealing cap 1040, thereby reducing failure of the wire 1080. In the illustrated embodiment, the electrical wire 1080 can terminate at an electrical connector 1090 after the wire 1080 is passed through the cap 1040. The electrical connector 1090 can be connected to electrical components or circuitry housed in the chamber. In some embodiments, the wire 1080 can advantageously deliver power to electrical components or circuitry in the chamber.

Returning to the electrical compartment as shown in FIG. 12, besides the sealing cap 1040, the electrical compartment 101 can have a compartment body 1000, at least one (e.g., one, two, three, or more) sealing ring(s) 1020, and a cap retainer 1060. The electrical component 101 can be sealed in a manner described above in connection with the electrical compartments 10, 20. For example, the sealing cap 1040, sealing retainer 1060, and sealing portions of the compartment body 1000 can operate in the same or in a similar manner to the operation of the sealing cap 140, sealing retainer 160, and compartment body 100 described above.

The electrical compartment 101 can further have connecting terminals 1077 exiting from the compartment body 1000. The connecting terminals 1077 can connect to at least one irrigation valve. In some embodiments, there may be more connecting terminals 1077 to individually connect to more irrigation valves, (e.g., two, three, four, or more irrigation valves). In some embodiments, the BOCC 11 maybe able to control each irrigation valve individually via programming or other commands sent from the central computer.

In some embodiments, the electrical compartment 101 can have connecting terminals 1079 exiting from the compartment body 1000. In some embodiments, the connecting terminals 1079 may be supplied as a loop, or otherwise connected together, to allow the controller to operate without an optional sensor. In other embodiments, the connecting terminals 1079 may be separated and connected to an optional sensor, such as a rain shut off sensor, a temperature sensor, or other sensors that may be used to inhibit and/or allow irrigation. For example, a user may cut a looped terminal 1079 and connect the open loop to a sensor (e.g., a rain shut off sensor). The rain sensor can be configured to close the loop in the absence of rain and open the loop in the presence of rain. Opening the loop can inhibit or prevent operation of the one or more irrigation valves. This functionality can reduce the likelihood that irrigation takes place during rain. The electrical compartment 101 can further have connecting terminals embedded into the wire 1034 exiting from the compartment body 1000. The wire 1034 can connect to a flow sensor 1032. The flow sensor 1032 can have similar functions as the flow sensor 32 shown in FIGS. 4A-4C and be mounted on a main water pipe as described above. The connecting terminals 1077 can also connect to other parts of the irrigation devices and/or to a central computer.

With continued reference to FIG. 12, a first end of the transmitter housing 1085 can be position on a closed end 1006 of the compartment body 1000. In some embodiments, the transmitter housing 1085 can form an integral part with the compartment body 1000. In other embodiments, the transmitter housing 1085 can be mechanically coupled (e.g., welded, adhered, fastened, and/or otherwise coupled) to the compartment body 1000. As shown in FIG. 13, the electrical connector 1090 can connect the wire 1080 to a controller circuitry 1095 inside the water electrical compartment 101, which can advantageously protect the controller circuitry 1095 from water, mud, dirt, and the like. In the illustrated embodiment, the controller circuitry 1095 can be attached to an inner wall of the closed end 1006 of compartment body 1000 defining a ceiling of the chamber 1012. The controller circuitry 1095 can also be electrically coupled to the transmitters 1086. The transmitters 1086 can advantageously send ON/OFF and/or other control signals to irrigation devices. In some embodiments, the housing 1085 can house receivers (not shown). In some embodiments, the housing 1085 can house both the transmitters and receivers, or transceivers to advantageously communicate wirelessly with irrigation devices. The BOCC 11 can have a detachable dome 1030 to facilitate mounting the BOCC 11 to a lid of an irrigation box. The detachable dome 1030 can be mechanically attached to a second end of the transmitter housing 1085. In some embodiments, the detachable dome 1030 can incorporate internal threads that can threadedly mate with external threads 1088 on an outer wall surface of the transmitting housing 1085.

The lid retainer nut 1035 can be used to mount the electrical compartment 101, the transmitters 1086 in the transmitter housing 1085, and the detachable dome 1030 on a plastic lid of a valve box (not shown). As shown in FIG. 13, the lid retainer nut 1035 can have internal threads 1089 that can threadedly mate with the external threads 1088 of the transmitter housing 1085. In some embodiments, the external threads 1088 can be custom threads having any desired size and/or tolerance. Installation of the BOCC 11 may be accomplished by removing the detachable dome 1030 and inserting the transmitter housing 1085 through a hole in the lid of a valve box. The detachable dome 1030 may then be reinstalled and tightened until hand tight. Tightening of the retainer nut 1035 may be performed to complete the installation, and reopening of the electrical compartment 101 can be in similar manners as described above regarding the WFS assembly 3.

Although this disclosure has been described in the context of certain embodiments and examples, it will be understood by those skilled in the art that the disclosure extends beyond the specifically disclosed embodiments to other alternative embodiments and/or uses and obvious modifications and equivalents thereof. In addition, while several variations of the embodiments of the disclosure have been shown and described in detail, other modifications, which are within the scope of this disclosure, will be readily apparent to those of skill in the art. Sensors other than flow sensors may be incorporated into any of the above mentioned devices. Other sensors may include soil moisture sensors, temperature, solar radiation, light, humidity, wind, and/or any other sensors that monitor irrigation efficiency, weather, plant conditions, or soil conditions. It is also contemplated that various combinations or sub-combinations of the specific features and aspects of the embodiments may be made and still fall within the scope of the disclosure. For example, features described above in connection with one embodiment can be used with a different embodiment described herein and the combination still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above. Accordingly, unless otherwise stated, or unless clearly incompatible, each embodiment of this invention may comprise, additional to its essential features described herein, one or more features as described herein from each other embodiment of the invention disclosed herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a sub combination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. Additionally, as used herein, "gradually" has its ordinary meaning (e.g., differs from a non-continuous, such as a step-like, change).

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A watertight electrical compartment of an irrigation device, comprising:
   an electrical compartment body comprising a chamber with an open end, and an outer wall surface having external threads and a sealing section, the sealing section located closer to the open end of the chamber than the external threads;
   at least one sealing ring having a diameter configured for mounting on the sealing section;
   a cap having an open end, a closed end, and an internal diameter configured to have a sliding fit with the sealing section and an interference fit with the sealing ring when the sealing ring is mounted on the sealing section; and
   a cap retainer having internal threads configured to threadedly mate with the external threads of the compartment body, the cap retainer further having first and second ends, the cap retainer configured to receive at least a portion of the cap through the first end.

2. The watertight electrical compartment of claim 1, wherein the cap has a non-threaded inner wall.

3. The watertight electrical compartment of claim 1, wherein an inner wall of the cap retainer further comprises a non-threaded portion further away from the first end of the cap retainer than the inner threads.

4. The watertight electrical compartment of claim 1, wherein the cap has a reduced outer diameter on its closed end and the cap retainer has a reduced inner diameter on its second end, the reduced inner diameter of the cap retainer configured to slidably accommodate the reduced outer diameter of the cap.

5. The watertight electrical compartment of claim 1, wherein the cap retainer has a shoulder at its second end having an internal diameter smaller than an outer diameter of the cap, the shoulder configured to keep the cap engaged with the sealing section when the internal threads of the cap retainer mates with the external threads of the compartment body.

6. The watertight electrical compartment of claim 1, wherein a wall of the cap further comprises at least one notch at the open end.

7. The watertight electrical compartment of claim 1, wherein the sealing section comprises at least one groove configured to receive the at least one sealing ring.

8. The watertight electrical compartment of claim 1, further comprising a plurality of sealing rings positioned between the cap and the outer wall surface of the electrical compartment body.

9. The watertight electrical compartment of claim 1, wherein the chamber of the compartment body is configured to house at least one battery.

10. The watertight electrical compartment of claim 9, wherein the chamber comprises battery contacts.

11. The watertight electrical compartment of claim 9, wherein the chamber comprises a DIP switch.

12. The watertight electrical compartment of claim 9, wherein the chamber comprises flash programming pads.

13. The watertight electrical compartment of claim 1, wherein the compartment is configured to be electrically coupled to a flow sensor.

14. The watertight electrical compartment of claim 1, wherein the sealing ring is resilient.

* * * * *